(12) United States Patent
Nishida et al.

(10) Patent No.: US 7,914,413 B2
(45) Date of Patent: Mar. 29, 2011

(54) AUTOMATIC TRANSMISSION

(75) Inventors: Masaaki Nishida, Anjo (JP); Hiroshi Katou, Anjo (JP); Masashi Kitou, Anjo (JP); Yuichi Seki, Anjo (JP); Hiroki Shintani, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 498 days.

(21) Appl. No.: 12/071,669

(22) Filed: Feb. 25, 2008

(65) Prior Publication Data
US 2008/0220928 A1 Sep. 11, 2008

Related U.S. Application Data

(60) Provisional application No. 60/935,284, filed on Aug. 3, 2007.

(30) Foreign Application Priority Data

Feb. 23, 2007 (JP) ................................. 2007-043279
Jul. 5, 2007 (JP) ................................. 2007-177824

(51) Int. Cl.
F16D 21/00 (2006.01)
F16D 25/06 (2006.01)
F16D 25/10 (2006.01)
F16H 3/62 (2006.01)
F16H 3/44 (2006.01)
F16H 37/06 (2006.01)

(52) U.S. Cl. ........ 475/275; 475/276; 475/293; 475/330; 192/48.619

(58) Field of Classification Search .................. 475/293, 475/275, 286, 317, 319, 323, 325, 330; 192/48.1, 192/48.61, 48.614
See application file for complete search history.

(56) References Cited

U.S. PATENT DOCUMENTS

| 4,380,179 | A | 4/1983 | Kubo et al. | |
|---|---|---|---|---|
| 6,139,463 | A | 10/2000 | Kasuya et al. | |
| 6,558,287 | B2 * | 5/2003 | Hayabuchi et al. | 475/271 |
| 7,294,087 | B2 * | 11/2007 | Hayabuchi et al. | 475/276 |
| 7,462,126 | B2 * | 12/2008 | Fukuyama et al. | 475/284 |
| 7,524,257 | B2 * | 4/2009 | Tabata et al. | 475/285 |
| 7,582,035 | B2 * | 9/2009 | Ootsuki et al. | 475/121 |
| 7,628,726 | B2 * | 12/2009 | Fukuyama et al. | 475/285 |
| 7,648,013 | B2 * | 1/2010 | Okada et al. | 192/48.601 |
| 7,731,623 | B2 * | 6/2010 | Nishida et al. | 475/275 |
| 2007/0060438 | A1 | 3/2007 | Fukuyama et al. | |
| 2007/0149337 | A1 * | 6/2007 | Okada et al. | 475/116 |
| 2007/0155568 | A1 * | 7/2007 | Ishii et al. | 475/116 |
| 2007/0184932 | A1 | 8/2007 | Tabata et al. | |

(Continued)

FOREIGN PATENT DOCUMENTS

JP B1 45-5963 2/1970

(Continued)

*Primary Examiner* — Tisha D Lewis
(74) *Attorney, Agent, or Firm* — Oliff & Berridge, PLC

(57) ABSTRACT

An automatic transmission that is structured such that the first clutch, the third clutch, and the fourth clutch are disposed in an axial direction more toward the speed-reduction planetary gear than the planetary gear unit; friction plates of the first clutch are disposed so as to be offset in the axial direction with respect to friction plates of the third clutch and friction plates of the fourth clutch; and the friction plates of the fourth clutch are disposed such that at least a portion thereof coincides in the axial direction with the friction plates of the third clutch on an inner peripheral side of the friction plates of the third clutch.

14 Claims, 4 Drawing Sheets

U.S. PATENT DOCUMENTS

| | | | |
|---|---|---|---|
| 2008/0202884 A1* | 8/2008 | Nishida et al. | 192/106 F |
| 2008/0207384 A1* | 8/2008 | Nishida et al. | 475/276 |
| 2008/0207386 A1* | 8/2008 | Nishida et al. | 475/276 |
| 2009/0011892 A1* | 1/2009 | Nishida et al. | 475/276 |

FOREIGN PATENT DOCUMENTS

| | | |
|---|---|---|
| JP | A 56-156549 | 12/1981 |
| JP | U 1-132844 | 9/1989 |
| JP | A 05-039866 | 2/1993 |
| JP | A-7-269665 | 10/1995 |
| JP | A 2000-240740 | 9/2000 |
| JP | A 2003-278798 | 10/2003 |
| JP | A-2006-342845 | 12/2006 |
| JP | A-2007-32624 | 2/2007 |
| WO | WO 2005/026579 A1 | 3/2005 |
| WO | WO 2005090827 A1 * | 9/2005 |

\* cited by examiner

FIG. 2

|      | C-1 | C-2 | C-3 | C-4 | B-1 | B-2 | F-1 |
|------|-----|-----|-----|-----|-----|-----|-----|
| 1st  | ●   |     |     |     |     | (●) | ●   |
| 2nd  | ●   |     |     |     | ●   |     |     |
| 3rd  | ●   |     | ●   |     |     |     |     |
| 4th  | ●   |     |     | ●   |     |     |     |
| 5th  | ●   | ●   |     |     |     |     |     |
| 6th  |     | ●   |     | ●   |     |     |     |
| 7th  |     | ●   | ●   |     |     |     |     |
| 8th  |     | ●   |     |     | ●   |     |     |
| Rev1 |     |     | ●   |     |     | ●   |     |
| Rev2 |     |     |     | ●   |     | ●   |     |

(●) OCCURS DURING ENGINE BRAKING

AUTOMATIC TRANSMISSION

INCORPORATION BY REFERENCE

The disclosure of Japanese Patent Application No. 2007-177824 filed on Jul. 5, 2007, Japanese Patent Application No. 2007-043279 filed on Feb. 23, 2007 and U.S. Provisional Patent Application No. 60/935,284 filed on Aug. 3, 2007, including the specification, drawings and abstract are incorporated herein by reference in their entirety.

BACKGROUND

The present invention relates to an automatic transmission.

There exists an automatic transmission that is used advantageously in an FF-type (front engine, front drive) vehicle. An automatic transmission has been proposed that is provided with a speed-reduction planetary gear set that generates gear change ratios for an output member (counter gear) of an automatic speed change mechanism and a speed-change planetary gear that generates a reduced rotation such that eight forward speeds and a reverse speed can be established. This automatic transmission is provided with three clutches that selectively input the reduced rotation and the input rotation from the speed-reduction planetary gear to the respective rotating elements of the speed-change planetary gear set. These three clutches are disposed on the speed-reduction planetary gear side in an axial direction with respect to the speed-change planetary gear set (refer, for example, to Japanese Patent Application Publication No. JP-A-2007-32624, FIG. 4).

SUMMARY

In recent years, in automatic transmissions that are mounted in vehicles or the like, increases in fuel economy have become necessary due environmental problems, and thus, even in comparatively small vehicles, a multi-speed shift has come to be required. In contrast, in automatic transmissions, as shown in Japanese Patent Application Publication No. JP-A-2007-32624, even in a multi-stage speed shift enabling automatic transmission that is used in an FF (front engine-front drive) type vehicle, size reduction has come to be required. That is, in the FF type vehicle, because the engine and the automatic transmission are disposed between the left and right front wheels, in terms of ensuring the steering angle of the front wheels, reductions particularly in the axial length are desired.

In the automatic transmission that is disclosed in Japanese Patent Application Publication No. JP-A-2007-32624, three clutches, which are each provided with a plurality of friction plates, are disposed parallel in an axial direction. Because the torque volume received by each of the friction plates of these three clutches is determined, the number of friction plates cannot be reduced. In addition, in order to ensure the torque volume of friction plates, increasing the surface area per friction plate can be considered, but this is not desirable because this causes the automatic transmission to become larger in the radial direction. As a result, reducing the size of the conventional automatic transmission in an axial direction has been difficult.

Thus, the present invention provides an automatic transmission that realizes a size reduction in the axial direction by improving the disposition of the first clutch, the third clutch, and the fourth clutch. The present invention also achieves various other advantages.

An exemplary aspect of the present invention includes an automatic transmission with a speed-reduction planetary gear that can reduce a rotation of an input shaft and output a reduced rotation; a planetary gear unit that is disposed coaxially to the speed-reduction planetary gear and includes a first rotating element, a second rotating element, a third rotating element, and a fourth rotating element; a first clutch that inputs the reduced rotation to the fourth rotating element; a second clutch that inputs the rotation of the input shaft to the second rotating element; a third clutch that inputs the reduced rotation to the first rotating element; a fourth clutch that inputs the rotation of the input shaft to the first rotating element; a first brake that holds a rotation of the first rotating element stationary; a second brake that holds a rotation of the second rotating element stationary; and an output member that is linked to the third rotating element. At least seven forward speeds and a reverse speed can be established, the first clutch, the third clutch, and the fourth clutch are disposed in an axial direction more toward the speed-reduction planetary gear than the planetary gear unit; friction plates of the first clutch are disposed so as to be offset in the axial direction with respect to friction plates of the third clutch and friction plates of the fourth clutch; and the friction plates of the fourth clutch are disposed such that at least a portion thereof coincides in the axial direction with the friction plates of the third clutch on an inner peripheral side of the friction plates of the third clutch.

BRIEF DESCRIPTION OF THE DRAWINGS

Various exemplary aspects of the invention will be described with reference to the drawings, wherein:

FIG. 2 is an engagement diagram of the automatic transmission;

DETAILED DESCRIPTION OF EMBODIMENTS

Best Modes for Carrying Out the Invention

Figure 1:
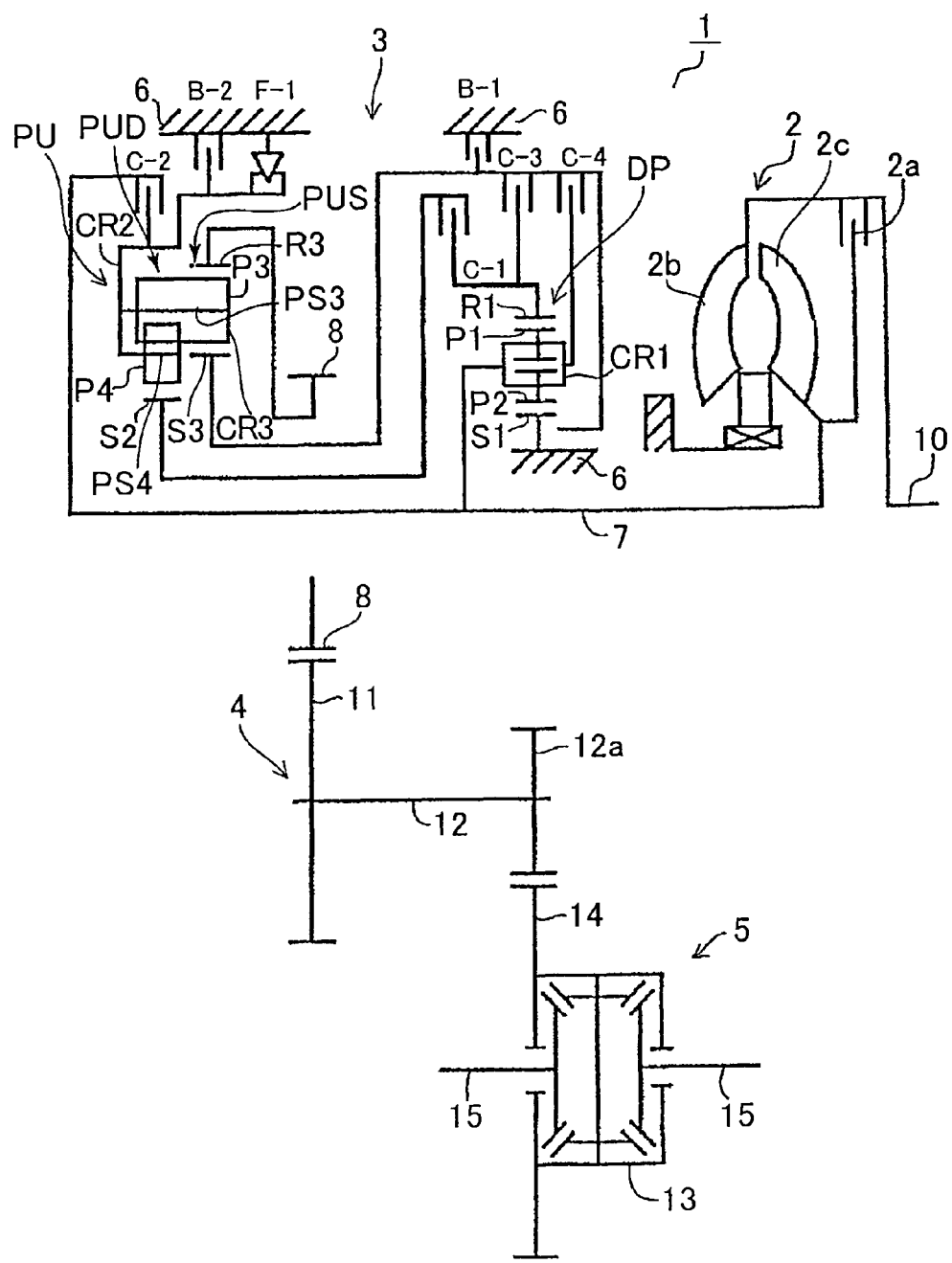
FIG. 1 is a skeleton drawing that shows an automatic transmission according to an embodiment of the present invention.
Figure 3:
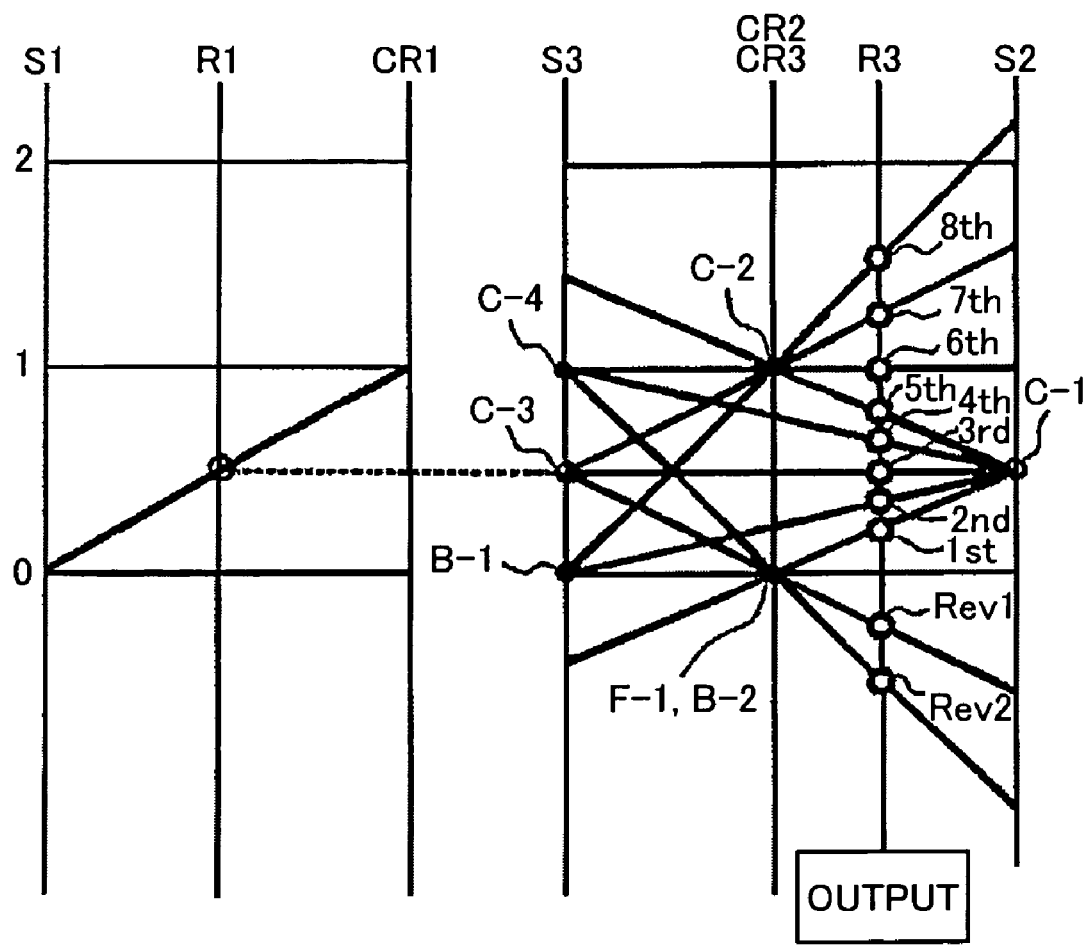
FIG. 3 is a velocity diagram of the automatic transmission.
Figure 4:
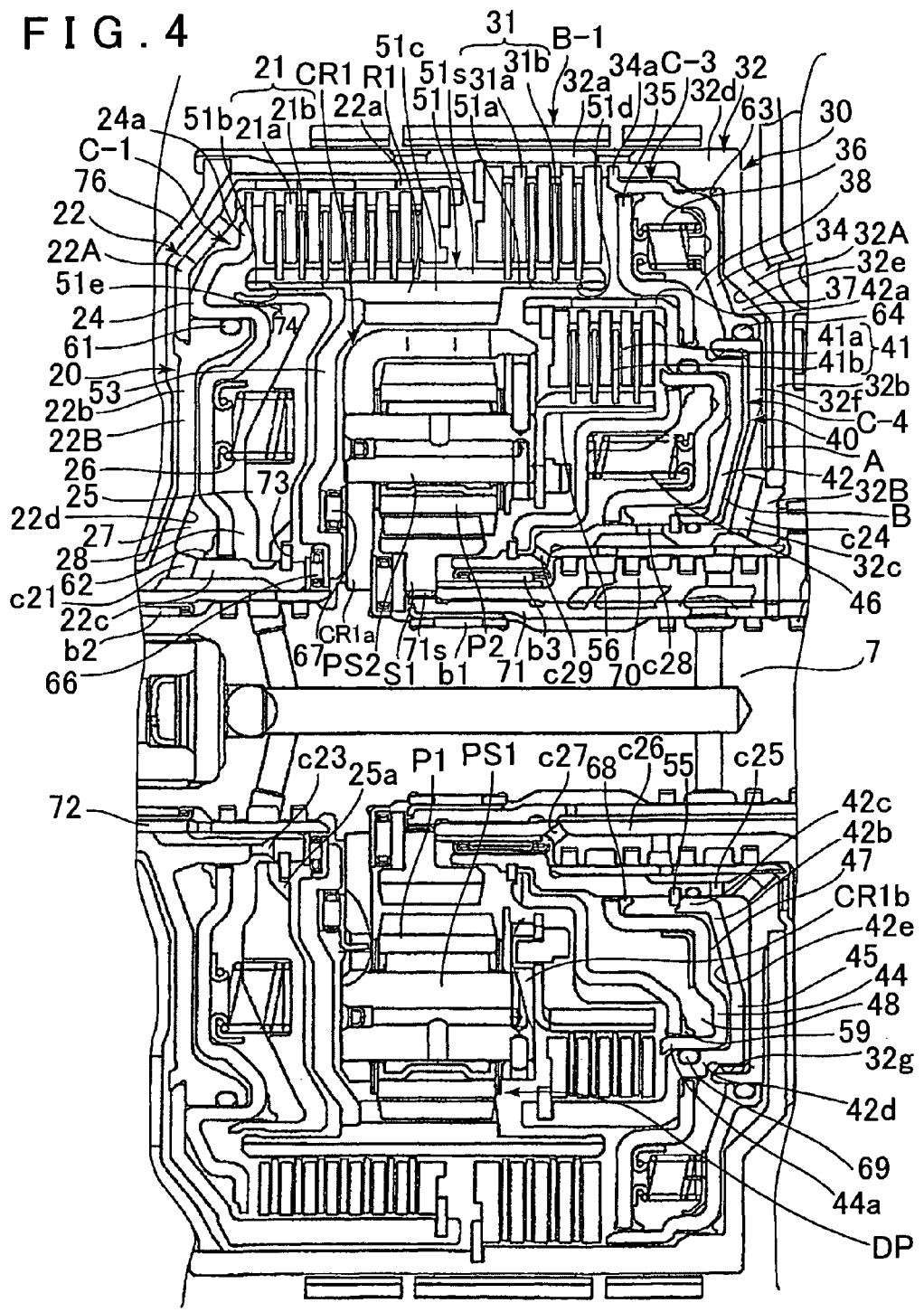
FIG. 4 is a side cross-sectional view that shows a portion of the automatic transmission.

Below, an embodiment of the present invention will be explained with reference to FIG. 1 through FIG. 4. FIG. 1 is a skeleton drawing that shows an automatic transmission according to the present embodiment; FIG. 2 is an engagement diagram for the automatic transmission; FIG. 3 is a velocity diagram of the automatic transmission, and FIG. 4 is a side cross-sectional view that shows a portion of the automatic transmission. Note that when the automatic transmission according to the present embodiment is mounted in a vehicle, an axial direction denotes the left-to-right direction with respect to the direction of forward travel of the vehicle, but in the present specification, the side to which the engine is connected, that is, an automatic transmission 1 viewed from a torque converter 2 side, is shown in a frontal view. Thus, FIG. 4 is a side cross-sectional view that is shown in a side view. In addition, in an axial direction, the torque converter 2 side is shown as the front side, and a clutch C-2 side is shown as the back side.

First, the schematic structure of the automatic transmission 1 that can use the present invention will be explained with reference to FIG. 1. As shown in FIG. 1, the automatic transmission 1 that is advantageously used in, for example, an FF type (front engine, front drive) vehicle is provided with a case 6 that includes a housing case and a transmission case. The automatic transmission 1 includes an input member (front cover and center piece) that can be connected to the engine (not illustrated) on the front side of the case 6. In addition, the torque converter 2 (which has a lock-up clutch 2a), a speed change mechanism 3, a counter shaft portion 4, and a differential portion 5 are disposed inside the case 6.

The torque converter 2 includes a pump impeller 2b that is connected to the input member 10 of the automatic transmission 1 and a turbine runner 2c to which the rotation of the pump impeller 2b is transferred via an operating fluid. The turbine runner 2c is connected to the input shaft 7 of the speed change mechanism 3, which is arranged coaxially to the input member 10 described above. In addition, the lock-up clutch 2a is provided in the torque converter 2. When the lock-up clutch 2a is engaged by the hydraulic control of a hydraulic control apparatus (not illustrated), the rotation of the input member 10 of the automatic transmission 1 is directly transferred to the input shaft 7 of the speed change mechanism 3.

A planetary gear (speed-reduction planetary gear) DP and a planetary gear unit PU are provided on the input shaft 7 in the speed change mechanism 3. This planetary gear DP is what is referred to as a double pinion planetary gear, and is provided with a sun gear (first sun gear) S1, a carrier (first carrier) CR1, and a ring gear (first ring gear) R1, and is configured such that a pinion P2, which meshes with the sun gear S1, and a pinion P1, which meshes with the ring gear R1, mesh together on the carrier CR1.

In addition, the planetary gear unit PU is formed by linking two planetary gears, that is, a single pinion planetary gear PUS and a double pinion planetary gear PUD. The single pinion planetary gear PUS is provided with a sun gear (third sun gear) S3, a carrier (second carrier) CR3, and a ring gear (second ring gear) R3. The double pinion planetary gear PUD is provided with a sun gear (second sun gear) S2 and a carrier (second carrier) CR2. Furthermore, the single pinion planetary gear PUS and the double pinion planetary gear PUD include a shared pinion that serves as a long pinion P3, and include a short pinion P4 that is provided in the double pinion planetary gear PUD and meshes together with the long pinion P3. In addition, the single pinion planetary gear PUS and the double pinion planetary gear PUD are provided with carriers CR2 and CR3 that support a pinion shaft PS3 that supports the long pinion P3 so as to rotate freely and a pinion shaft PS4 that supports the short pinion P4 so as to be able to rotate freely. Note that the carriers CR2 and CR3 are explained such that the carrier CR2 is included in the double pinion planetary gear PUD and the carrier CR3 is included in the single pinion planetary gear PUS, but the carriers CR2 and CR3 include a shared long pinion P3, and act as a single carrier that rotates integrally. Specifically, the planetary gear PU is what is referred to as a Ravigneaux planetary gear, and includes (as four rotating elements) the sun gear (fourth rotating element, second sun gear) S2 that serves as the sun gear of the double pinion planetary gear PUD, the sun gear (first rotating element, third sun gear) S3 that serves as the sun gear of the single pinion planetary gear PUS, the carriers (second rotating element, second carrier) CR2 and CR3, and the ring gear (third rotating element, second ring gear) R3. Note that the order of the numerals of each of the rotating elements (first through fourth) that are shown in the parentheses is the order of the rates of the speed when these rotating elements are rotating. That is, as shown in FIG. 3, this is the sequence from the left side in the figure of the planetary gear PU in the velocity diagram that will be explained in detail below.

Furthermore, the planetary gear unit PU includes a short pinion P4 on the inner peripheral side of the long pinion P3 in the double pinion planetary gear PUD. Thus, the sun gear S3 of the single pinion planetary gear PUS is a sun gear having a larger external diameter than the sun gear S2 of the double pinion planetary gear PUD. In addition, the single pinion planetary gear PUS is disposed more toward the planetary gear DP side (the right side in the figure) than the double pinion planetary gear PUD, and when linked with a member that extends from the planetary gear DP side, it is possible to dispose the member that is linked to the sun gear S2 through the inner peripheral side of the sun gear S3. Thus, it is possible to reduce the size of the automatic transmission 1 in a radial direction than in the case in which the double pinion planetary gear PUD is disposed on the planetary gear DP side.

The sun gear S1 of the planetary gear DP is integrally attached to the case 6. In addition, the carrier CR1 rotates (below, referred to as the "input rotation") identically to the input shaft 7, and is connected to a clutch (fourth clutch) C-4. Furthermore, the ring gear R1 has a reduced rotation in which the input rotation is reduced by the sun gear S1, which is held stationary, and the carrier CR1, which provides the input rotation, and is connected to a clutch (first clutch) C-1 and a clutch (third clutch) C-3.

The sun gear S3 of the planetary gear unit PU is connected to the brake (first brake) B-1 and is freely held stationary on the case 6, is connected to the clutch C-4 and the clutch C-3, and the input rotation of the carrier CR1 is freely input via the clutch C-4 and the reduced rotation of the ring gear R1 is freely input via the clutch C-3. In addition, the sun gear S2 is connected to the clutch C-1 and the reduced rotation of the ring gear R1 is freely input.

Furthermore, the carrier CR2 (CR3) is connected to the clutch (second clutch) C-2, to which the rotation of the input shaft 7 is input, and the input rotation is freely input via the clutch C-2. In addition, the carrier CR2 is connected to a one-way clutch F-1 and the brake (second brake) B-2, and the rotation thereof is restricted to one direction with respect to the case 6 via the one-way clutch F-1, and the rotation is freely held stationary via the brake B-2. In addition, the ring gear R3 is connected to a counter gear (output member) 8, which is supported so as to rotate freely on a center support member (not illustrated) that is held stationary with respect to the case 6.

In addition, a large-diameter gear 11, which is held stationary on a countershaft 12 of the countershaft portion 4, meshes with the counter gear 8, and a gear 14 of the differential portion 5 meshes with the countershaft 12 via a small-diameter gear 12a that is formed on the outer peripheral surface. In addition, the gear 14 is held stationary by a differential gear 13 and is connected to the left and right vehicle axles 15 and 15 via the differential gear 13.

Next, based on the structure that has been described above, the operation of the shift change mechanism 3 will be explained with reference to FIG. 1 and FIG. 3.

The automatic transmission 1 having the structure that is described above carries out speed shifting based on the vehicle load in a range of shift speeds according to a range that has been selected by the driver by control that uses an electronic control unit and a hydraulic control apparatus (not illustrated). FIG. 2 shows in a diagram the shift speeds that are established by engaging and disengaging the clutches and brakes (O indicates engagement, and no mark indicated disengagement). In addition, FIG. 3 shows in a velocity diagram the relationship between the shift speeds that are established by engaging the clutches and brakes (• indicates respective engagements) and the drive ratios of each of the shift elements at that time. Note that in this velocity diagram, the ordinate shows the speed of the respective rotating elements (each gear), and the abscissa shows the correspondence to the gear ratio of each of the rotating elements. In addition, in the part of the planetary gear unit PU in the velocity diagram, when each of the speed shift elements in order from the one end (the left side in FIG. 3) in the abscissa direction is set from the first through fourth elements, the first rotating element corresponds to the large diameter sun gear S3 and is linked to the paths that respectively input the rotation that has been reduced by the planetary gear DP by the clutch C-3 and the input rotation of the input shaft 7 by the clutch C-4, and is linked so as to be able to be locked by the brake B-1. Furthermore, the second rotating element corresponds to the carrier CR2 (CR3), and is linked to the path that inputs the input rotation of the input shaft 7 by the clutch C-2, and is linked so as to be able to be locked by the brake B-2. In addition, the third rotating element corresponds to the ring gear R3 and is linked to the counter gear 8. Furthermore, the fourth rotating element corresponds to the small diameter sun gear S2, and is linked to the path that inputs the rotation that has been reduced by the planetary gear DP by the clutch C-1.

In the D (drive) range, for example, as shown in FIG. 2, in the first forward speed (1st), the clutch C-1 and the one-way clutch F-1 are engaged. Thus, as shown in FIG. 1 and FIG. 3, the rotation of the ring gear R1, which has been reduced by the sun gear S1 that is held stationary and the carrier CR1 that provides the input rotation, is input to the sun gear S2 via the clutch C-1. In addition, the rotation of the carrier CR2 (CR3) is restricted to one direction (the positive rotation direction), that is, the reverse rotation of the carrier CR2 is prevented and thereby it is held stationary. Thus, the reduced rotation that has been input to the sun gear S2 is output to the ring gear R3 via the carrier CR2, which is held stationary, and a positive rotation, which serves as the first forward speed, is output from the counter gear 8.

Note that during engine braking (coasting), the state of the first forward speed is maintained by locking the brake B-2 to hold the carrier CR2 stationary, and thereby the positive rotation of the carrier CR2 is prevented. In addition, in the first forward speed, the reverse rotation of the carrier CR2 is prevented and a positive rotation is permitted by the one-way clutch F1. Thereby, for example, establishing the first forward speed while switching from a non-travel range to a travel range can be carried out smoothly by the automatic engagement of the one-way clutch F1.

In the second forward speed (2nd), as shown in FIG. 2, the clutch C-1 is engaged, and the brake B-1 is locked. Thereby, as shown in FIG. 1 and FIG. 3, the rotation of the ring gear R1 which is reduced by the sun gear S1 which is held stationary and the carrier CR1 which provides the input rotation is input to the sun gear S2 via the clutch C-1. In addition, the rotation of the sun gear S3 is held stationary, due to locking the brake B-1. Thereby, rotation of the carrier CR2 acquires a reduced rotation that is lower than that of the sun gear S2, this reduced rotation that is input to the sun gear S2 is output to the ring gear R3 via the carrier CR2, and a positive rotation, which serves as the second forward speed, is output from the counter gear 8.

In the third forward speed (3rd), as shown in FIG. 2, the clutch C-1 and the clutch C-3 are engaged. Thereby, as shown in FIG. 1 and FIG. 3, the rotation of the ring gear R1 which is reduced by the sun gear S1 which is held stationary and the carrier CR1 which provides the input rotation is input to the sun gear S2 via the clutch C-1. In addition, the reduced rotation of the ring gear R1 is input to the sun gear S3 due to the engagement of the clutch C-3. Specifically, the reduced rotation of the ring gear R1 is input to the sun gear S3 and the sun gear S2, and thus the planetary gear unit PU becomes directly linked to the reduced rotation, the reduced rotation is directly output to the ring gear R3, and a positive rotation, which serves as the third forward speed, is output from the counter gear 8.

In the fourth forward speed (4th), as shown in FIG. 2, the clutch C-1 and the clutch C-4 are engaged. Thereby, as shown in FIG. 1 and FIG. 3, the rotation of the ring gear R1 which is reduced by the sun gear S1 which is held stationary and the carrier CR1 which provides the input rotation is input to the sun gear S2 via the clutch C-1. In addition, the input rotation of the carrier CR1 is input to the sun gear S3 due to the engagement of the clutch C-4. Thus, the carrier CR2 acquires a reduced rotation that is higher than that of the sun gear S2, the reduced rotation that has been input, to the sun gear S2 is output to the ring gear R3 via the carrier CR2, and a positive rotation, which serves as the fourth forward speed, is output from the counter gear 8.

In the fifth forward speed (5th), as shown in FIG. 2, the clutch C-1 and the clutch C-2 are engaged. Thereby, as shown in FIG. 1 and FIG. 3, the rotation of the ring gear R1 which is reduced by the sun gear S1 which is held stationary and the carrier CR1 which provides the input rotation is input to the sun gear S2 via the clutch C-1. In addition, the input rotation is input to the carrier CR2 due to the engagement of the clutch C-2. Thereby, due to the reduced rotation that is input to the sun gear S2 and the input rotation that is input to the carrier CR2, the input rotation acquires a reduced rotation that is higher than that of the fourth forward speed, this reduced rotation is output to the ring gear R3, and a positive rotation, which serves as the fifth forward speed, is output from the counter gear 8.

In the sixth forward speed (6th), as shown in FIG. 2, the clutch C-2 and the clutch C-4 are engaged. Thereby, as shown in FIG. 1 and FIG. 3, the input rotation of the carrier CR1 is input to the sun gear S3 due to the engagement of the clutch C-4. In addition, the input rotation is input to the carrier CR2 due to the engagement of the clutch C-2. That is, because the input rotation is input to the sun gear S3 and the carrier CR2, the planetary gear unit PU is directly linked to the input rotation, the input rotation is directly output to the ring gear R3, and a positive rotation, which serves as the sixth forward speed, is output from the counter gear 8.

In the seventh forward speed (7th), as shown in FIG. 2, the clutch C-2 and the clutch C-3 are engaged. Thereby, as shown in FIG. 1 and FIG. 3, the rotation of the ring gear R1 which is reduced by the sun gear S1 which is held stationary and the carrier CR1 which provides the input rotation is input to the sun gear S3 via the clutch C-3. In addition, the input rotation is input to the carrier CR2 due to the engagement of the clutch C-2. Thereby, the rotation acquires an increased rotation that is slightly higher than the input rotation due to the reduced rotation that has been input to the sun gear S3 and the input rotation that has been input to the carrier CR2, this increased rotation is output to the ring gear R3, and a positive rotation, which serves as the seventh forward speed, is output from the counter gear 8.

In the eighth forward speed (8th), as shown in FIG. 2, the clutch C-2 is engaged, and the brake B-1 is locked. Thereby, as shown in FIG. 1 and FIG. 3, the input rotation is input to the carrier CR2 due to the engagement of the clutch C-2. In addition, the rotation of the sun gear S3 is held stationary due to the locking of the brake B-1. Thereby, the input rotation of the carrier CR2 acquires an increased rotation that is higher than that of the seventh forward speed described above due to the sun gear S3, which is held stationary, the increased rotation is output to the ring gear R3, and a positive rotation, which serves as the eighth forward speed, is output from the counter gear 8.

In the first reverse speed (Rev 1), as shown in FIG. 2, the clutch C-3 is engaged and the brake B-2 is locked. Thereby, as shown in FIG. 1 and FIG. 3, the rotation of the ring gear R1 which is reduced by the sun gear S1 which is held stationary and the carrier CR1 which provides the input rotation is input to the sun gear S3 via the clutch C-3. In addition, the rotation of the carrier CR2 is held stationary due to the locking of the brake B-2. Thereby, the reduced rotation that has been input to the sun gear S3 is output to the ring gear R3 via the stationary carrier CR2, and a reverse rotation, which serves as the first reverse speed, is output from the counter gear 8.

In the second reverse speed (Rev 2), as shown in FIG. 2, the clutch C-4 is engaged and the brake B-2 is locked. Thereby, as shown in FIG. 1 and FIG. 3, the input rotation of the carrier CR1 is input to the sun gear S3 due to the engagement of the clutch C-4. In addition, the rotation of the carrier CR2 is held stationary due to the locking of the brake B-2. Thereby, the input rotation that is input to the sun gear S3 is output to the ring gear R3 via the carrier CR2, which is held stationary, and a reverse rotation, which serves as the second reverse speed, is output form the counter gear 8.

Note that, for example, in the P (parking) and the N (neutral) range, the clutch C-1, the clutch C-2, the clutch C-3, and the clutch C-4 are disengaged. Thereby, the carrier CR1 and the sun gear S3, the ring gear R1 and the sun gear S3, the ring gear R1 and the sun gear S2, that is, the planetary gear DP and the planetary gear unit PU, are disconnected. In addition, the input shaft 7 and the carrier CR2 are disconnected. Thereby, the power transfer between the input shaft 7 and the planetary gear unit PU is cut, that is, the drive transfer between the input shaft 7 and the counter gear 8 is cut.

Note that in the automatic transmission 1 according to the present embodiment, an explanation was provided in which eight forward speeds and two reverse speeds are established. However, for example, an automatic transmission 1 that does not use eight forward speeds but rather establishes seven forward speeds and two reverse speeds may be used. That is, provided that the automatic transmission is able to establish shift speeds by using predetermined brakes and four clutches, it is possible to use the present invention in automatic transmissions that have any number of shift speeds.

Next, the clutch C-1, the clutch C-3, the clutch C-4, and the planetary gear DP of the automatic transmission 1 according to the present invention will be explained with reference to FIG. 4. The planetary gear DP, which consists of the double pinion planetary gear, is disposed on the input shaft 7 inside the case 6 (refer to FIG. 1), and the sun gear S1, the carrier CR1, and the ring gear R1 are disposed therein. Among these, the sun gear S1 is fit onto the outer peripheral surface of the input shaft 7, and linked to the sleeve member 71 by the spline 71s that is formed in the outer peripheral surface of the back side end portion of the sleeve member 71, which extends forward. This sleeve member 71 rotatably supports the input shaft 7 via the bearing b1, and is integrally fastened to the inner peripheral surface of the boss portion 70, which extends from the inner diameter side of the pump cover of an oil pump (not illustrated) that is provided in front of the case 6 toward the back side. Therefore, the sun gear S1 is linked such that rotation with respect to the case 6 is impossible.

The carrier CR1 includes a back carrier plate CR1a on the back side and a front carrier plate CR1b on the front side, and the pinion shafts PS1 and PS2 are supported by both of these carrier plates CR1a and CR1b. In addition, the pinion shaft PS1 rotatably supports the pinion P1 described above, and the pinion shaft PS2 rotatably supports the pinion P2 described above. In addition, the pinion P1 meshes with the ring gear R1 on the outer peripheral side, and at the same time, meshes with the pinion P2, and the pinion P2 meshes with the sun gear S1 at the inner peripheral side. Furthermore, the back carrier plate CR1a is integrally fastened to the input shaft 7 at the inner peripheral end portion thereof. Thereby, the carrier CR1 is formed so as to be supported by the input shaft 7 and to rotate identically to the input shaft 7.

On the outer peripheral side of the ring gear R1, a hub portion 51, which will be described below in detail, is integrally formed, and at the back side portion of the ring gear R1, the ring gear R1 is fastened to the outer radial end portion of a supporting member 53, which is formed into a substantially hollow disc shape. The back side of the supporting member 53 is rotatably supported by a hollow shaft portion 22c of the clutch drum 22 of the clutch C-1, which will be described below, at the inner peripheral side via a bearing 66, and the front side thereof is rotatably supported by the back carrier plate CR1a of the carrier CR1 via a bearing 67. Thereby, the ring gear R1 is rotatably supported with respect to the input shaft 7 via the clutch drum 22 of the clutch C-1, the back carrier plate CR1a of the carrier CR1, and the supporting member 53.

Next, the clutch C-1, the clutch C-3, and the clutch C-4 according to the present invention will be explained in detail. At the inner peripheral side of the brake B-1, the clutch C-1 is disposed from the outer peripheral side to the back side of the planetary gear DP. The clutch C-1 is provided with friction plates 21 that include outer friction plates 21a and inner friction plates 21b, and a hydraulic servo 20 that connects and disconnects these friction plates 21, and these inner friction plates 21b are spline engaged to the hub portion 51, which will be described below.

The hydraulic servo 20 includes the clutch drum 22, a piston member 24, a cancel plate 25, and a return spring 26, and thereby, the operating oil chamber 27 and the cancel oil chamber 28 are structured. The clutch drum 22 is integrally structured by fastening an outer peripheral side member 22A and an inner peripheral side member 22B, and opens toward the planetary gear DP side (the front side). The clutch drum 22 includes a flange portion 22b that extends from the inner peripheral side to the outer peripheral side, a drum portion 22a that extends from the outer peripheral side of the flange portion 22b to the outer peripheral side of the planetary gear DP toward the front side, and, at the inner peripheral side of the flange portion 22b, a hollow shaft portion 22c that extends toward the front side and is formed into a hollow shaft shape.

At the front side of the flange portion 22b, a cylinder portion 22d for structuring the operating oil chamber 27 described above is formed on a part that is opposed to the piston member 24. In the drum portion 22a of the clutch drum 22, at the outer peripheral side of the planetary gear DP, the outer friction plates 21a are spline engaged at the inner peripheral side. The hollow shaft portion 22c is disposed so as to fit into the sleeve member 72, and the sleeve member 72 is rotatably disposed with respect to the input shaft 7 due to the bearing b2. Specifically, the hollow shaft portion 22c is rotatably disposed with respect to the input shaft 7 via the sleeve member 72.

The piston member 24 is disposed opposite to the cylinder portion 22d so as to move freely in an axial direction by fitting into the front side of the hollow shaft portion 22c at the front side of the flange portion 22b of the clutch drum 22, which has been described above. In addition, the piston member 24 and the clutch drum 22 form an oil-tight operating oil chamber 27 therebetween due to being sealed by a seal ring 61 and a seal member 62. Furthermore, a pressing portion 24a extends on the outer peripheral side of the piston member 24, and the front end of the pressing portion 24a is disposed so as to oppose the friction plates 21. In addition, a spline is formed in the outer peripheral end portion of the pressing portion 24a, and this outer peripheral portion is spline engaged to a spline that is formed on the inner peripheral end side of the drum portion 22a of the clutch drum 22.

The movement of the cancel plate 25 in the forward direction is restricted by a snap ring 73 that is fit into the front side of the hollow shaft portion 22c described above. A return spring 26 is compressed between the cancel plate 25 and the piston member 24 that is disposed on the back side thereof, and an oil-tight cancel oil chamber 28 is formed by a sealing member 74 that is disposed on the outer peripheral portion of this cancel plate 25.

At the inner peripheral side of the brake B-1, the clutch C-3 is disposed from the outer peripheral side of the planetary gear DP toward the front side. The clutch C-3 is provided with friction plates 31 that consist of outer friction plates 31a and inner friction plates 31b, and a hydraulic servo 30 that connects and disconnects these friction plates 31. The inner friction plates 31b are spline engaged to the hub portion 51, which will be described below.

The hydraulic servo 30 includes a clutch drum 32 that forms a cylinder portion 32e, a piston member 34, a cancel plate 35, and a return spring 36, and thereby, the operating oil chamber 37 and the cancel oil chamber 38 are formed. The clutch drum 32 is integrally formed by fastening an outer peripheral side member 32A and an inner peripheral side member 32B. The outer peripheral side member 32A has a flange portion 32b that extends from the inner peripheral side to the outer peripheral side and a drum portion 32a that extends from the outer peripheral side of the flange portion 32b to the outer peripheral side of the friction plates 31 described above. The inner peripheral side member 32B that has a hollow shaft portion 32c that is fit into the boss portion 70 of the pump cover (not illustrated). The clutch drum 32 is disposed so as to open toward a direction (back side) that is opposed to the clutch drum 22 of the clutch C-1. In addition, the inner peripheral side member 32B includes a piston supporting portion 32f that extends from the front side portion of the hollow shaft portion 32c toward the outer peripheral side and is formed into a flange shape.

At the outer peripheral side of the planetary gear DP, the drum portion 32a is spline engaged to the outer friction plates 31a at the inner peripheral side, and at the front end portion, a flange portion 32b is formed toward the inner peripheral side. Note that the drum portion 32a passes through the outer peripheral side of the clutch drum 22, substantially extends up to the back side of the clutch drum 22, and is connected to a connecting portion 76. In addition, the connecting member 76 is connected to the sun gear S3 of the planetary gear unit PU, which has been described above. Specifically, when the clutch C-3 is engaged, the clutch drum 32 and the connecting member 76 rotate identically, that is, the rotation (reduced rotation) of the ring gear R1 of the planetary gear DP is transferred to the sun gear S3 of the planetary gear unit PU.

Note that a wall portion 32d that forms a wall is provided at the front end portion of the drum portion 32a, that is, the outer peripheral end portion of the flange portion 32b. It is possible to bore a hole in the wall portion 32d from the front side in an axial direction at a freely selected portion in the peripheral direction by drilling and the like, and thereby, it is possible to balance the clutch drum 32.

The hollow shaft portion 32c is rotatably supported at the inner peripheral surface of the back side portion via a bearing b3 at the distal end portion of the boss portion 70 of the pump cover, as has been described above. In addition, a collar portion 32g, which is formed so as to extend a short distance toward the back side in an axial direction at the outer peripheral side, is provided at the front side portion of the hollow shaft portion 32c, that is, at the piston supporting portion 32f of the inner peripheral side member 32B, and this collar member 32g is spline engaged to a stepped portion 42d of the clutch drum 42 of the clutch C-4 at the inner peripheral side.

The piston member 34 is disposed at the back of the flange portion 32b of the clutch drum 32 so as to be opposed to the cylinder portion 32e and to move freely in an axial direction with respect to the wall portion 32d by fitting the piston supporting portion 32f, and an oil-tight operating oil chamber 37 is formed between the piston member 34 and the clutch drum 32 due to being sealed by the sealing member 63 and the seal ring 64. In addition, a pressing portion 34a is formed at the back outer peripheral side of the piston member 34, and the back end of the pressing portion 34a is disposed so as to oppose the friction plates 31. Furthermore, a spline is formed in the outer peripheral surface of the pressing portion 34a, and the pressing portion 34a is spline engaged to a spline that is formed in the inner peripheral side of the drum portion 32a of the clutch drum 32.

The cancel plate 35 is disposed at the back side of the piston member 34, and the return spring 36 is compressed between the cancel plate 35 and the piston member 34, and the oil-tight cancel oil chamber 38 is formed by the sealing members that are disposed at the outer peripheral portion and the inner peripheral portion of the cancel plate 35.

The clutch C-4 is disposed between the planetary gear DP and the clutch C-3, that is, at a portion that encloses the clutch drum 32. This clutch C-4 is provided with the friction plates 41, which consist of the outer friction plates 41a and the inner friction plates 41b, and a hydraulic servo 40 that connects and disconnects these friction plates 41. The friction plates 41 are disposed such that a portion thereof coincides in an axial direction on the inner peripheral side of the friction plates 31 of the clutch C-3. In addition, the inner friction plates 41b are spline engaged to a clutch hub 56, and this clutch hub 56 is connected to the front carrier plate CR1b of the carrier CR1. Thereby, the clutch hub 56, which is spline engaged to the inner friction plates 41b of the clutch C-4, is formed separately from the carrier plate CR1b of the carrier CR1. In comparison to the case in which the clutch hub 56 and the front carrier plate CR1b are integrally formed, it is possible to eliminate the limitation that the position of the pinion shafts PS1 and PS2 of the carrier plate CR1b in the radial direction and the position of the clutch plate 56 in the radial direction are formed so as to be offset.

The hydraulic servo 40 includes a clutch drum 42 on which a cylinder portion 42e is formed, a piston member 44, a cancel plate 45, and a return spring 46. Thereby, the operating oil chamber 47 and the cancel oil chamber 48 are structured. The clutch drum 42 is structured by a flange portion 42b that extends from the inner peripheral side to the outer peripheral side, a drum portion 42a that extends from the outer peripheral side of the flange portion 42b to the outer peripheral side of the friction plates 41, and a boss portion 42c that is fit into the hollow shaft portion 32c of the clutch drum 32, and is disposed so as to open toward the same direction (the back side) as the clutch C-3.

The drum portion 42a is disposed on the front side of the planetary gear DP and the inner peripheral side of the friction plates 31 of the clutch C-3, the outer friction plates 41a are spline engaged on the inner peripheral side, and on the front end portion, the stepped portion 42d that is spline engaged with the collar portion 32g of the clutch drum 32 is formed, and a flange portion 42b is formed from the stepped portion 42d toward the inner peripheral side. The boss portion 42c is fit into the front part of the hollow shaft portion 32c of the clutch drum 32, and the movement thereof is restricted in the rearward direction by a snap ring 55.

The piston member 44 is at the back of the flange portion 42b of the clutch drum 42, and is disposed opposite to the cylinder portion 42e so as to freely move in an axial direction by fitting into the hollow shaft portion 32c of the clutch drum 32. The oil-tight operating oil chamber 47 is formed between the piston member 44 and the clutch drum 42 by being sealed by using the seal member 68 and the seal ring 69. In addition, the pressing portion 44a is formed on the back outer peripheral side of the piston member 44, and the back end of the pressing portion 44a is disposed opposed to the friction plates 41.

The cancel plate 45 is disposed at the back side of the piston member 44, and the return spring 46 is compressed between the cancel plate 45 and the piston member 44. A substantially oil-tight cancel oil chamber 48 is structured by the seal member 59 that is disposed on the outer peripheral portion of the cancel plate 45.

Next, the hub portion 51 will be explained. The hub portion 51 is integrally formed on the outer peripheral side of the ring gear R1, and is provided with a proximal end portion 51c that forms the outer peripheral surface portion of the ring gear R1, a front projecting portion 51a that is disposed so as to project toward the front side in an axial direction, and a back projecting portion 51b that is disposed so as to project toward the back side in an axial direction. In addition, on the outer peripheral surface of the hub portion 51, a spline 51s is formed so as to extend across the proximal end portion 51c, the front projecting portion 51a, and the back projecting portion 51b. In addition, the inner friction plates 31b of the clutch C-3 are spline engaged to the front projection portion 51a of the spline 51s, and the inner friction plates 21b of the clutch C-1 are spline engaged to the proximal end portion 51c and the back projecting portion 51b so as to be adjacent to the inner friction plates 31b.

In addition, a plurality of lubricating oil holes 51d, which pass through the recessed portions and the inner peripheral side of the spline 51s, are formed in the circumferential direction in the front projecting portion 51a of the hub portion 51. Furthermore, a plurality of lubricating oil holes 51e, which pass through the recessed portions and the inner peripheral side of the spline 51s, are formed in the circumferential direction in the back projecting portion 51b of the hub portion 51.

Next, the operation of the clutch C-1, the clutch C-3, and the clutch C-4 will be explained. Due to the hydraulic pressure that is produced in the operating oil chamber 27, the clutch C-1 moves the piston member 24 in an axial direction and the engagement and disengagement of the clutch C-1 is carried out by pressing the friction plates 21. The operating oil pressure for the clutch C-1 is supplied to the operating oil chamber 27 from a hydraulic control apparatus (not illustrated) through an oil path c21 that is formed in the clutch drum 22. In addition, due to the centrifugal hydraulic pressure that acts in the operating oil chamber 27, the lubricating oil is supplied to the cancel oil chamber 28, which opposes the operating oil chamber 27 with the piston member 24 interposed therebetween, via the oil path c23 that is formed in the clutch drum 22, and the centrifugal hydraulic pressure that is produced in the operating oil chamber 27 is brought to equilibrium.

The engagement and disengagement of the clutch C-3 is carried out by moving the piston member 34 in an axial direction due to the hydraulic pressure that is produced in the operating oil chamber 37 and pressing the friction plates 31. The operating oil pressure for the clutch C-3 is supplied from a hydraulic pressure control apparatus (not illustrated) through a gap A to the operating oil chamber 37. The gap A is formed into a flat shape that extends from the oil path c24, which is formed in the clutch drum 32, over the entire periphery thereof. In addition, due to the centrifugal hydraulic pressure that acts in the operating oil chamber 37, the lubricating oil is supplied via a gap B to the cancel oil chamber 38, which is opposed to the operating oil chamber 37 with the piston member 34 interposed therebetween. The gap B is provided with a flat shape that extends from the oil path c25, which is formed in the clutch drum 32, over the entire periphery thereof, and a centrifugal hydraulic pressure is produced in the cancel oil chamber 38 and balanced with the centrifugal hydraulic pressure that is produced in the operating oil chamber 37.

The engagement and disengagement of the clutch C-4 is carried out by moving the piston member 44 in an axial direction due to the hydraulic pressure that is produced in the operating oil chamber 47, and pressing the friction plates 41. The operating oil for the clutch C-4 is supplied to the operating oil chamber 47 from a hydraulic control apparatus (not illustrated) through an oil path c28 that is formed in the hollow shaft portion 32c of the clutch drum 32. In addition, because a centrifugal oil pressure is acting in the operating oil chamber 47, lubricating oil is supplied via an oil path c29 that is formed in the hollow shaft portion 32c to the cancel oil chamber 48 that is opposed to the operating oil chamber 47, with the piston member 44 interposed therebetween, and balanced with the centrifugal oil pressure that is generated in the operating oil chamber 47.

Next, the supply of the lubricating oil will be explained. When lubricating oil with oil pressure that is produced by, for example, an oil pump (not illustrated) is supplied to the oil path c23 that is formed in the clutch drum 22, the lubricating oil is supplied to the cancel oil chamber 28 as cancel oil. At the same time, the lubricating oil is supplied to the outer peripheral side through the space between the cancel plate 25 and the supporting member 53 via the notched portion 25a that is provided in the cancel plate 25. The lubricating oil that has been supplied to the space between the cancel plate 25 and the supporting member 53 is then supplied to the inner peripheral side of the back projecting portion 51b of the hub portion 51, and lubricates the friction plates 21 via the lubricating oil holes 51e in the hub portion 51.

In contrast, when lubricating oil with the oil pressure that is generated by, for example, an oil pump (not illustrated) is supplied to the oil path c26 that is formed in the boss portion 70, the lubricating oil is supplied to the space between the boss portion 70 and the hollow shaft portion 32c of the clutch drum 32 via the oil path c27. The lubricating oil that has been supplied to the space between the boss portion 70 and the hollow shaft portion 32c lubricates the bearing b3, and at the same time, the lubricating oil passes through the space between the hollow shaft portion 32c and the sun gear S1, and is supplied to the front side of the planetary gear DP. The lubricating oil that has been supplied to the front side of the planetary gear DP lubricates the pinion P1 and the pinion P2 via an oil path that is formed in the front carrier plate CR1b, and at the same time, the lubricating oil passes through a gap in the front carrier plate CR1b, is then supplied to the inner peripheral side of the front projecting portion 51a of the hub portion 51, and lubricates the friction plates 31 via the lubricating oil hole 51d of the hub portion 51.

In this arrangement, in comparison to the ratio of the inner diameter of the lubricating oil holes 51*e* to the length in an axial direction when the friction plates 21 is disposed, the ratio of the inner diameter of the lubricating oil holes 51*d* to the length in an axial direction when the friction plates 31 are disposed is large. In comparison to the friction plates 21, the friction plates 31 are supplied with the lubricating oil more efficiently. This is because, as shown in FIG. 2, during travel, with respect to the clutch C-1 and the clutch C-3, it is thought that the number of times that the clutch C-3 engages and disengages will be large in comparison to the number of times that the clutch C-1 engages and disengages. Therefore, in comparison to the friction plates 21 of the clutch C-1, the friction plates 31 of the clutch C-3, which are engaged and disengaged a high number of times, are supplied with lubricating oil more efficiently, and thus the lubricating efficiency of the automatic transmission 1 is advantageous.

In the automatic transmission 1 according to the present invention as described above, the clutch C-1 and the clutch C-3 transfer a reduced rotation and the clutch C-4 transfers the input rotation, and thus the clutch C-1 and the clutch C-3 transfer a torque that is larger that that of the clutch C-4. In addition, the clutch C-1 engages during low speed establishment, and the third clutch C-3 is engaged at a higher shift speed than the first clutch C-1, and thus the clutch C-1 transfers a torque that is larger than that of the clutch C-3. Thus, the clutch C-1, which requires the largest torque volume, is disposed so as not to coincide in an axial direction with the friction plates 31 of the clutch C-3 and the friction plates 41 of the clutch C-4, and on the inner peripheral side of the friction plates 31 of the clutch C-3, which requires the next largest torque volume, the friction plates 41 of the clutch C-4, and the friction plates 41 of the clutch C-4, which requires the smallest torque volume, is disposed. Thus, the friction plates 21 of the clutch C-1 can be disposed without being restricted in the radial direction by the friction plates 31 of the clutch C-3 and the friction plates 41 of the clutch C-4, and the external diameter of friction plates 31 of the clutch C-3 can be made larger than that of the outer diameter of the friction plates 41 of the clutch C-4. Thus, it is possible to make the torque volume of the clutch C-3 large in comparison to the clutch C-4, and it is possible to make the torque volume of the clutch C-1 large in comparison to that of the clutch C-3. Thus, it is possible to reduce the length of the automatic transmission 1 in an axial direction while ensuring the respectively necessary torque volumes.

In addition, the clutch drum 22 of the hydraulic servo 20 of the clutch C-1 and the clutch drum 32 of the hydraulic servo 30 of the clutch C-3 are disposed such that the opening directions are opposed and the planetary gear DP is interposed therebetween, and on the outer peripheral side of the ring gear R1, the friction plates 21 of the first clutch C-1 and the friction plates 31 of the clutch C-3 are disposed in parallel so as to be spline engaged to the hub portion 51 that is formed so as to project from the ring gear R1 on both sides in an axial direction. Thus, it is possible to dispose the friction plates 21 of the clutch C-1 and the friction plates 31 of the clutch C-3 without the clutch drum 22 of the hydraulic servo 20 of the clutch C-1 being interposed therebetween. Thereby, the friction plates 21 of the clutch C-1 and the friction plates 31 of the clutch C-3 can be disposed close to each other, and at the same time, it is possible to dispose the friction plates 21 of the clutch C-1 and the planetary gear DP so as to coincide in the axial direction, and it is possible to reduce the size of the automatic transmission 1 in an axial direction.

In addition, the friction plates 41 of the clutch C-4 are disposed such that at least a portion thereof coincides in an axial direction on the inner peripheral side of the friction plates 31 of the clutch C-3, and thus, in comparison to the case in which the friction plates 41 of the clutch C-4 and the friction plates 31 of the clutch C-3 are arranged in a row in an axial direction, it is possible to shorten the dimension in an axial direction, and it is possible to reduce the size of the automatic transmission 1 in an axial direction.

In addition, the friction plates 31 of the clutch C-3 is spline engaged to a part of the hub portion 51 that projects from the ring gear R1 in an axial direction and in which the lubricating oil holes 51*d* are formed, and thus, the lubricating oil can be supplied from the inner peripheral side. Therefore, because the friction plates 21 of the clutch C-1 are disposed so as to be spline engaged from the part of the hub portion 51 that projects in an axial direction from one side of the ring gear R1 to the part that coincides with the ring gear R1 in an axial direction, the friction plates 31 of the clutch C-1 can be supplied with lubricating oil with high efficiency, and even in the case in which the number of times that the clutch C-3, which engages at a plurality of shift speeds that are separated by two or more speeds, is engaged and disengaged is high, it is possible to make the lubrication efficiency of the automatic transmission 1 advantageous.

In addition, the clutch hub 56 of the clutch C-4 and the front carrier plate CR1*b* of the carrier CR1 of the planetary gear DP are formed separately, and at the same time, the clutch hub 56 is fastened and disposed on the front carrier plate CR1*b*. Thus, for example, in the case in which the carrier CR1 and the clutch hub 56 are integrally formed, it is necessary to offset the supporting portions of the piston shafts PS1 and PS2 and the base of the clutch hub 56 in a radial direction, and there are restrictions on the position in a radial direction at which the clutch hub 56 can be disposed. However, according to the present invention, the front carrier plate CR1*b* and the clutch hub 56 are formed separately, and thus it is possible to fasten and dispose the clutch hub 56 at a desired position in a radial direction, and it is possible to dispose the clutch C-4 on the inner peripheral side of the clutch C-3.

In addition, in the case in which the sun gear S2 and the sun gear S3 are each linked to a member that extends from the planetary gear DP, the member that is linked to the sun gear S2 can be disposed through the inner peripheral side of the sun gear S3, and it is possible to reduce the length in a radial direction even when the clutch C-4 is disposed on the side opposite to the planetary gear unit PU of the planetary gear DP while reducing the size in the radial direction.

INDUSTRIAL APPLICABILITY

The automatic transmission according to the present invention can be used in a vehicle such as passenger vehicles, trucks, buses, agricultural vehicles, and the like, is advantageous when used when a reduction in the length of the automatic transmission in an axial direction is required, and in particular, is advantageous when a reduction in the length of an automatic transmission in an axial direction that enables multiple shift speeds that are used in an FF-type vehicle.

According to an exemplary aspect of the invention, it is possible to reduce the length of the automatic transmission in an axial direction by the amount that the friction plates of the third clutch and the friction plates of the fourth clutch coincide in an axial direction.

In addition, the first clutch and the third clutch transfer the reduced rotation and the fourth clutch transfers the input rotation, and thus the first clutch and the third clutch transfer a torque that is larger than that of the fourth clutch. Furthermore, the first clutch engages during the establishment of a low shift speed and the third clutch engages at a higher shift speed side than the first clutch, and thus the first clutch transfers a torque that is larger than that of the third clutch. Thus, the first clutch, which requires the largest torque volume, is disposed so as not to coincide in an axial direction with the friction plates of the third clutch and the friction plates of the fourth clutch, and the friction plates of the fourth clutch, which require the smallest torque volume, are disposed at the inner peripheral side of the friction plates of the fourth clutch, which requires the next largest torque volume. Thus, the friction plates of the first clutch can be disposed in the radial direction without being limited by the friction plates of the third clutch and the friction plates of the fourth clutch, and the external diameter of the friction plates of the third clutch can be set larger than the external diameter of the friction plates of the fourth clutch. Thereby, it is possible to make the torque volume of the third clutch large in comparison to that of the fourth clutch, and it is possible to make the torque volume of the first clutch large in comparison to the third clutch. Thus, it is possible to reduce the size of the automatic transmission in an axial direction while ensuring the respective necessary torque volumes.

According to an exemplary aspect of the invention, it is possible to reduce the length of the automatic transmission in an axial direction by the amount that the hydraulic servo of the third clutch and the hydraulic servo of the fourth clutch coincide in an axial direction.

In addition, the third clutch transfers the reduced rotation to the first rotating element and the fourth clutch transfers the input rotation to the first rotating element, and thus the third clutch transfers a torque that is larger than that of the fourth clutch. Thus, the hydraulic servo of the fourth clutch is disposed more on the inner peripheral side than the hydraulic servo of the third clutch, and thereby the diameter of the hydraulic servo of the third clutch can be made larger than the diameter of the hydraulic servo of the fourth clutch, the torque volume of the third clutch can be made large in comparison to that of the fourth clutch, and it is possible to reduce the length of the automatic transmission in the axial direction while ensuring the torque volume.

According to an exemplary aspect of the invention, it is possible to reduce the length in the axial direction of the automatic transmission by the amount that a portion of the cancel oil chamber of the third clutch and the friction plates of the fourth clutch coincide in an axial direction.

According to an exemplary aspect of the invention, in comparison to the case in which the friction plates of the first clutch and the friction plates of the third clutch are disposed, for example, such that the clutch drum of the hydraulic servo of the first clutch is interposed therebetween, it is possible to dispose the friction plates of the first clutch and the friction plates of the third clutch close to each other, and it is possible to reduce the size of the automatic transmission in an axial direction.

According to an exemplary aspect of the invention, the friction plates of the third clutch and the friction plates of the fourth clutch can be disposed to coincide in an axial direction and it is possible to reduce the size of the automatic transmission in an axial direction due to a simple structure just by disposing a portion of the friction plates of the third clutch on the hub portion.

According to an exemplary aspect of the invention, it is possible to make advantageous the lubrication efficiency of the friction plates of the third clutch that are disposed on the hub portion that projects from the first ring gear. That is, it is possible to supply the lubricating oil with high efficiency to the third clutch, to which the reduced rotation is transferred and which has a high torque volume.

According to an exemplary aspect of the invention, it is possible to make advantageous the lubrication efficiency of the automatic transmission even in the case in which the number of times that the third clutch, which engages at a plurality of shift speeds that are separated by two or more speeds, is engaged and disengaged becomes high.

According to an exemplary aspect of the invention, it is possible to dispose the friction plates of the first clutch and the friction plates of the third clutch close at the outer peripheral side of the speed-reduction planetary gear, and it is possible to dispose the friction plates of the first clutch and the speed-reduction planetary gear so as to coincide in an axial direction. Thus, it is possible to reduce the size of the automatic transmission in an axial direction while ensuring the torque volume of the first clutch and the third clutch.

According to an exemplary aspect of the invention, for example, in the case in which the first carrier and the clutch hub are integrally formed, it is necessary to offset the supporting portion of the pinion shaft and the base of the clutch hub at positions in a radial direction, and there are limitations in the position at which the clutch hub can be disposed in the radial direction. However, according to the present invention, because the side plate of the carrier and the clutch hub are structured separately, it is possible to fasten and dispose the clutch hub at the desired position in the radial direction, and it is possible to dispose the fourth clutch on the inner peripheral side of the third clutch.

According to an exemplary aspect of the invention, in the case in which the second sun gear and the third sun gear are each linked to a member that extends from the speed-reduction planetary gear side, it is possible to dispose the member that links to the second sun gear through the inner peripheral side of the third sun gear, and it is possible to reduce the length in the axial direction even when the fourth clutch is disposed on the side opposite to the planetary gear unit of the speed-reduction planetary gear while enabling the reduction of the size in the radial direction.

According to an exemplary aspect of the invention, the present automatic transmission can be advantageously used in an automatic transmission that establishes eight forward speeds and at least a first reverse speed.

The invention claimed is:

1. An automatic transmission, comprising:
    an input shaft;
    a speed-reduction planetary gear that can reduce a rotation of the input shaft and output a reduced rotation;
    a planetary gear unit that is disposed coaxially to the speed-reduction planetary gear and includes a first rotating element, a second rotating element, a third rotating element, and a fourth rotating element;
    a first clutch that inputs the reduced rotation to the fourth rotating element;
    a second clutch that inputs the rotation of the input shaft to the second rotating element;
    a third clutch that inputs the reduced rotation to the first rotating element, the third clutch including a hydraulic servo with a piston member, a clutch drum and sealing members;
    a fourth clutch that inputs the rotation of the input shaft to the first rotating element, the fourth clutch including a hydraulic servo with a piston member, a clutch drum and sealing members;
    a first brake that holds a rotation of the first rotating element stationary;

a second brake that holds a rotation of the second rotating element stationary;
an output member that is linked to the third rotating element, wherein:
at least seven forward speeds and a reverse speed can be established,
the first clutch, the third clutch, and the fourth clutch are disposed in an axial direction more toward the speed-reduction planetary gear than the planetary gear unit;
friction plates of the first clutch are disposed so as to be offset in the axial direction with respect to friction plates of the third clutch and friction plates of the fourth clutch,
the friction plates of the fourth clutch are disposed such that at least a portion of the friction plates of the fourth clutch overlap in a radial direction with the friction plates of the third clutch on an inner peripheral side of the friction plates of the third clutch,
the hydraulic servo of the fourth clutch is disposed such that at least a portion of the hydraulic servo of the fourth clutch overlaps in the radial direction with an inner peripheral side of the hydraulic servo of the third clutch, and
the sealing members of the third clutch are disposed in the radial direction on an outer peripheral side of the sealing members of the fourth clutch.

2. The automatic transmission according to claim 1, wherein at least a portion of a cancel oil chamber of the third clutch is disposed so as to overlap in the radial direction with the friction plates of the fourth clutch and so as to overlap in the axial direction with the friction plates of the third clutch at an outer peripheral side of the friction plates of the fourth clutch.

3. The automatic transmission according to claim 1, wherein:
a hydraulic servo of the first clutch is disposed in the axial direction in a space between the speed-reduction planetary gear and the planetary gear unit,
the hydraulic servo of the third clutch and the hydraulic servo of the fourth clutch are disposed in the axial direction on a side opposed to the planetary gear unit with respect to the speed-reduction planetary gear, and
a clutch drum of the hydraulic servo of the first clutch and the clutch drum of the hydraulic servo of the third clutch are disposed such that a direction of openings of the clutch drum of the hydraulic servo of the first clutch and of the clutch drum of the hydraulic servo of the third clutch are opposed and the speed-reduction planetary gear is interposed therebetween.

4. The automatic transmission according to claim 1, wherein the speed-reduction planetary gear comprises:
a first sun gear that is held stationary with respect to a case;
a first carrier to which the rotation of the input shaft is input; and
a first ring gear that acquires the reduced rotation that is lower than the rotation of the input shaft due to the first sun gear, whose rotation is held stationary, and the rotation of the input shaft of the first carrier.

5. The automatic transmission according to claim 4, further comprising:
a hub portion, at least a portion of which projects from one side of the first ring gear in the axial direction, is formed on an outer peripheral side of the first ring gear of the speed-reduction planetary gear, wherein:
at least a portion of the friction plates of the third clutch is disposed so as to be spline engaged to a portion of the hub portion that projects from the first ring gear.

6. The automatic transmission according to claim 5, wherein a lubricating oil hole is formed on the portion of the hub portion that projects from the first ring gear, the lubricating oil hole guiding lubricating oil that is supplied from an inner peripheral side of the hub portion to an outer peripheral side of the hub portion.

7. The automatic transmission according to claim 6, wherein the third clutch is a clutch that engages at a plurality of shift speeds that are separated by two or more speeds.

8. The automatic transmission according to claim 5, wherein:
the hub portion is formed so as to project in the axial direction on the other side of the first ring gear on the outer peripheral side thereof,
at least a portion of the friction plates of the first clutch are disposed so as to be spline engaged to a portion of the hub portion that projects on the other side, and
the friction plates of the first clutch and the friction plates of the third clutch are disposed along the axial direction on an outer peripheral side of the hub portion.

9. The automatic transmission according to claim 4, further comprising:
a clutch hub that is spline engaged to the friction plates of the fourth clutch, wherein:
the first carrier of the speed-reduction planetary gear comprises a side plate that rotatably supports a pinion, the clutch hub and the side plate are formed separately, and the clutch hub is fastened and disposed on the side plate.

10. The automatic transmission according to claim 1, wherein:
the planetary gear unit comprises a single pinion planetary gear and a double pinion planetary gear that are both linked to a carrier,
the single pinion planetary gear is disposed more toward the speed-reduction planetary gear than the double pinion planetary gear,
the fourth rotating element is a sun gear of the double pinion planetary gear, and
the first rotating element is a sun gear of the single pinion planetary gear.

11. The automatic transmission according to claim 10, wherein the second rotating element is a carrier that rotatably supports a long pinion that is shared by the single pinion planetary gear and the double pinion planetary gear and a short pinion that meshes with the long pinion and forms the double pinion planetary gear.

12. The automatic transmission according to claim 1, wherein:
a first forward speed is established by the first clutch engaging and the second brake locking;
a second forward speed is established by the first clutch engaging and the first brake locking;
a third forward speed is established by the first clutch engaging and the third clutch engaging;
a fourth forward speed is established by the first clutch engaging and the fourth clutch engaging;
a fifth forward speed is established by the first clutch engaging and the second clutch engaging;
a sixth forward speed is established by the second clutch engaging and the fourth clutch engaging;
a seventh forward speed is established by the second clutch engaging and the third clutch engaging;
a eighth forward speed is established by the second clutch engaging and the first brake locking; and
a reverse speed is established by the third clutch or the fourth clutch engaging and the second brake locking.

13. The automatic transmission according to claim 1, wherein:
- the sealing members of the third clutch contact the piston member of the third clutch, and
- the sealing members of the fourth clutch contact the piston member of the fourth clutch.

14. The automatic transmission according to claim 1, wherein:
- an oil chamber is formed between the piston member and the clutch drum of the third clutch and sealed by the sealing members of the third clutch, and
- an oil chamber is formed between the piston member and the clutch drum of the fourth clutch and sealed by the sealing members of the fourth clutch.

* * * * *